United States Patent Office.

JOHN ELLIS, OF NEW YORK, N. Y.

Letters Patent No. 77,470, dated May 5, 1868.

IMPROVED MATERIAL FOR PURIFYING AND DECOLORING PETROLEUM.

*The Schedule referred to in these Letters Patent and making part of the same.*

TO ALL WHOM IT MAY CONCERN:

Be it known that I, JOHN ELLIS, of the city, county, and State of New York, have invented a new and useful Improvement in the Methods of Preparing Materials for Purifying and Decoloring Petroleum and other fluids; and I do hereby declare that the following is a full, clear, and exact description of the same.

My improvements consist of preparing for the purpose, and of using in a filter, for the purpose of filtering oils or other fluids through them, either phosphate of lime or phosphate of lime as found in combination with carbonate of lime and other substances in semi-calcined bones, or, again, as found in charred or semi-calcined "Navassa phosphate of lime," or other phosphatic deposits found in various parts of the earth.

If the material to be used is obtained from bones, the latter may be either burned whole or pulverized before burning. The bones may be placed directly in contact with a fire which results from the burning of some combustible material, or, what is better, they may be placed in a pan, kettle, oven, or retort, with a slow fire beneath or around the same. The oil contained in the bones may be allowed to burn from their surface or escape in vapor. The bones are to be exposed to the atmosphere, or at least to a current of air, and kept at a slight red heat until the animal matter is so far destroyed, that when pulverized the resulting powder is of an ash or grayish color. If the external surface of the bones is slightly white, little injury results; but the heat to which they are subjected should never be so intense nor long-continued as to perfectly calcine, or render any considerable portion of them perfectly white, for if they are so changed, the carbonate of lime, more or less of which exists in the bones, is decomposed, and the carbonic acid is driven off, leaving lime, which will seriously interfere with the bleaching-properties of the phosphate of lime in contact with it.

The activity of animal charcoal, as it comes from the manufacturer, is very much increased as a bleaching-material by subjecting it, as directed above for bones, to a slight red heat while exposed to the air, perhaps occasionally stirring it until it ceases to be black, and becomes of a grayish color, thus sufficiently destroying the animal matter to allow the oil or other fluid being filtered to come in contact more freely with the phosphate and carbonate of lime.

"Navassa phosphate of lime," and other deposits containing either phosphate of lime or phosphorus, must be either charred in a retort or kettle, or kept at a slight red heat while exposed to the air, as directed in the praparation of bones for use.

Pure phosphate of lime may be used without any preparation.

All of the materials named above, after oil or other fluids have been filtered through them until the fluid ceases to be materially changed in color by passing through the filter, can be renovated and rendered again active by reburning them either in a closed or nearly closed retort, or in an open fire, as heretofore directed for their first preparation.

What I claim, and desire to secure by Letters Patent, is—

1. The method of preparing bones, animal charcoal, "Navassa phosphate of lime," and other phosphatic deposits, in the manner described in the foregoing specifications, as materials for filtering and bleaching petroleum and other fluids.

2. For the purpose of filtering and bleaching petroleum and all the fluids produced from it, including residuum and the heavier oil, after the lighter fluids have been separated from it, I claim the use of pure phosphate of lime, and the commercial article, and also either and all, separately or combined, of the materials or substances which result from treating bones, animal charcoal, Navassa phosphate of lime, or other phosphatic deposits, in the manner described in the foregoing specifications.

In testimony whereof, I have signed my name to this specification in the presence of two subscribing witnesses.

JOHN ELLIS.

Witnesses:
   MICH'L CONNOLLY,
   H. GARRETT.